United States Patent
Grisso et al.

(10) Patent No.: US 6,264,399 B1
(45) Date of Patent: Jul. 24, 2001

(54) METHOD TO REMEDIATE SOIL USING A SURFACTANT OF A SALT OF AN ACRYLAMIDOALKANESULFONIC ACID-AMINE REACTION PRODUCT

(75) Inventors: Bryan A. Grisso, Wickliffe; Richard W. Jahnke, Mentor, both of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/418,346

(22) Filed: Oct. 14, 1999

(51) Int. Cl.[7] ............................... B09C 1/02; B09C 1/08; B09C 1/10
(52) U.S. Cl. ............... 405/128.5; 134/25.1; 210/631; 210/747; 405/128.75; 405/263; 435/262.5; 588/205; 588/206; 588/207; 588/249; 588/901
(58) Field of Search ............................. 405/128, 263, 405/128.5, 128.75; 588/205, 206, 207, 248, 249, 901; 134/10, 25.1, 40; 210/631, 747, 908, 909; 435/262.5

(56) References Cited

U.S. PATENT DOCUMENTS

| | | |
|---|---|---|
| 3,544,597 | 12/1970 | Killam . |
| 4,997,313 * | 3/1991 | Gibson et al. ................. 405/128 |
| 5,398,756 * | 3/1995 | Brodsky et al. ............. 405/128 X |
| 5,427,688 * | 6/1995 | Sivavec ......................... 210/909 X |
| 5,453,133 | 9/1995 | Sparks et al. .................. 134/25.1 |
| 5,611,642 | 3/1997 | Wilson ............................. 405/128 |
| 5,615,975 * | 4/1997 | Wang et al. ..................... 405/128 |
| 5,634,983 | 6/1997 | Kammeraad ................... 134/25.1 |
| 5,725,470 * | 3/1998 | Lazarowitz et al. ............ 588/249 |
| 5,769,569 | 6/1998 | Hosseini ......................... 405/128 |
| 5,803,664 | 9/1998 | Kawabata et al. .............. 405/128 |
| 5,834,540 | 11/1998 | Katoot ............................. 524/104 |
| 5,846,434 * | 12/1998 | Seaman et al. .............. 210/747 X |
| 5,849,193 * | 12/1998 | Varadaraj et al. .......... 405/128 X |
| 5,928,433 * | 7/1999 | Jahnke et al. ................ 588/249 X |
| 6,099,206 * | 8/2000 | Pennell ............................ 405/128 |
| 6,149,351 * | 11/2000 | Doyle ........................... 405/128 X |

FOREIGN PATENT DOCUMENTS

| | | |
|---|---|---|
| 1329565 | 9/1973 | (GB) . |
| 1550420 | 8/1979 | (GB) . |

OTHER PUBLICATIONS

PCT International Search Report for International Appln. PCT/US00/27201 (The Lubrizol Corporation, Serial No. 09/325,136).

* cited by examiner

*Primary Examiner*—George Suchfield
(74) *Attorney, Agent, or Firm*—Samuel B. Laferty; Michael F. Esposito

(57) ABSTRACT

A method for remediating soil which is contaminated by one or more hydrophobic organic chemicals, comprising:

contacting the contaminated soil with an aqueous composition comprising a surfactant prepared by reacting a sulfonate of the formula

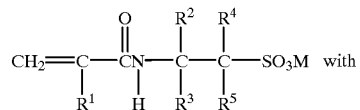

an amine wherein $R^1$ is hydrogen or methyl, $R^2$ is hydrogen or an alkyl group containing up to 18 carbon atoms, and each of $R^3$, $R^4$ and $R^5$ is individually hydrogen or an alkyl group containing up to 7 carbon atoms and M is an alkali metal, an alkaline earth metal or $-NR^{10}R^{11}R^{12}$ wherein $R^{10}$, $R^{11}$ and $R^{12}$ are independently hydrogen or hydrocarbyl groups containing from 1 to 22 carbon atoms and removing said aqueous compositions and organic chemicals associated therewith from the soil.

27 Claims, No Drawings

METHOD TO REMEDIATE SOIL USING A SURFACTANT OF A SALT OF AN ACRYLAMIDOALKANESULFONIC ACID-AMINE REACTION PRODUCT

FIELD OF THE INVENTION

This invention relates to a method for remediation of contaminated soil by contacting said soil with a surfactant that is prepared by reacting a salt of an acrylamidoalkanesulfonic acid with an amine.

BACKGROUND OF THE INVENTION

Man and the industrialized world have continually wrought havoc on the natural environment and the public is consistently reminded of the undesirable sick effects of the unfettered discharge of industrial wastes and other forms of air, water and soil pollutants. While it is still unclear exactly how much irreparable damage has been done up to this point in time, it is evident that positive steps must be taken to reverse the direction in which today's society is going and every effort must be made to save and rehabilitate that which has been already damaged.

Soil pollution is a major problem which must be addressed in the very near future. Unbridled and thoughtlessly uncontrolled dumpings of solid, liquid and gaseous pollutants find their way into the soil and can remain there for years. Polycyclic hydrocarbons, a common class of chemicals discharged by industries everywhere, possess toxic, mutagenic and carcinogenic properties. Hydrocarbon solvents have been carelessly dumped into the soil for years and problematically remain there with nowhere else to go. Thousands of tons of toxic compounds are buried in the soil every year in high commercial landfills and these are scattered throughout the surrounding area for miles by rain and sub-surface ground water. Besides industrial and municipal wastes, pesticides, herbicides, and insecticides ultimately end up in the soil and, as they are not readily degradable, persist there for a long time.

Soil pollutants widely prevalent today are known as organic contaminants which are organic compounds such as low molecular weight alkanes, alcohols, amines, amides, acids, sulfites, dioxins, ethylbenzenes and PCBs. Soil decontamination of these compounds as well as other pollutants has been achieved to a limited extent through solvent extraction, coagulation, high pressure cleaning, supercritical fluid extraction, thermal desorptions, soil vapor extraction, incineration and microbial oxidation. Physical means include pumping the ground soil with water followed by air stripping the soil to remove the volatile hydrocarbons, vacuum extraction and site excavations followed by incineration of the contaminated soil.

U.S. Pat. No. 5,453,133 (Sparks et al., Sep. 26, 1995) relates to a process for removing contaminants, such as hydrocarbons, from soil. The process involves contacting the contaminated soil with a suitable solvent for the contaminant, in the presence of a bridging liquid which is immiscible with the solvent, while agitating. The amount of the bridging liquid and the degree of agitation are balanced to control the particle size of the substantially contaminant- and solvent-free soil agglomerates so formed.

U.S. Pat. No. 5,611,642 (Wilson, Mar. 18, 1997) provides a method and apparatus for in-situ treatment of soil and ground water contaminated with organic pollutants. The process involves defining the nature and extent of the contamination; determining the hydrology and geology of the contaminated area; determining the volume and concentration of a reactive solution required to effect treatment of the contaminated area; injecting the reactive solution into one or more injectors that are inserted into the ground, sealed and positioned so as to assure flow of the reactive solution through the contaminated area; allowing the reactive solution to flow through the contaminated area thereby reacting chemically with the contaminants contained within the contaminated area; and determining when the treatment is complete by monitoring by-products of the chemical reaction. Preferably, the reactive solution is an aqueous solution of hydrogen peroxide and metallic salts.

U.S. Pat. No. 5,634,983 (Kammeraad, Jun. 3, 1997) relates to a process of soil remediation in which an encapsulation solution is introduced into contact with a soil matrix containing chemical contaminants such as polynucleated aromatics chloronated hydrocarbons and the like in an amount sufficient to form a saturated admixture of the soil matrix and the encapsulation solution, the encapsulation solution being capable of preferentially attracting the chemical contaminants contained in the soil matrix, and containing an effective amount of non-ionic surfactant material, an anionic surfactant material and water; and the admixture is admixed for an interval sufficient to permit the chemical contaminants to preferentially dissociate from contact with the soil matrix in favor of association with the encapsulation solution and at least one carbon bond in the chemical contaminant to be broken as a result of interaction between the non-ionic surfactant material and the contaminant. Once this occurs, a major portion of the encapsulation solution with associated chemical contaminants can be removed from contact with the soil matrix.

U.S. Pat. No. 5,725,470 (Lazarowitz et al., Mar. 10, 1998) discloses a process for the remediation of soil containing volatile organic compounds which comprises the steps of: (1) forming an emulsifier comprising: (a) from about 70 to about 99% by weight of a sugar surfactant selected from the group consisting of an alkyl polyglycoside, a glucamide, and mixtures thereof; and (b) from about 1 to about 30% by weight of a nonionic surfactant, other than said sugar surfactant which, when combined with said sugar surfactant, provides a hydrophilic-lipophilic balance of from about 8.0 to about 13.0; (2) mixing said emulsifier with said unwanted contaminants to form a stable emulsion; and (3) removing said stable emulsion from said soil.

U.S. Pat. No. 5,769,569 (Hosseini, Jun. 23, 1998) discloses an in-situ thermal desorption system and process is utilized for mobilization and removal of non-volatile and semi-volatile hydrocarbons from contaminated soil in the vadose zone. Persistent hydrocarbons are thermally desorbed by direct heating of the contaminated zone through combustion of fuel and air in a burner underneath the contaminated soil zone. The generated soil vapors are collected and treated by soil vapor extraction techniques.

U.S. Pat. No. 5,803,664 (Kawabata et al., Sep. 8, 1998) relates to a process for remedying a soil contaminated with a pollutant by using a microorganism, comprising the steps of:

injecting a liquid containing a microorganism capable of degrading the pollutant into a predetermined site of the soil region to be remedied; and injecting gas into the predetermined site where the liquid agent is injected, wherein the gas injection step is conducted when a water content of the site is 0.6 or more times a saturation water content of the soil.

U.S. Pat. No. 5,834,540 (Katoot, Nov. 10, 1998) relates to a composition and process for the remediation of contaminated materials, and in particular for soil remediation. The reference relates to compositions and processes that cause the breakdown of unwanted contaminates, such as hydrocarbon wastes. The reference relates to the further use of radiation, preferably microwave radiation, to effect the degradation of contaminates. The reference is equally effective in treating materials that have been exposed to harmful or infectious biological contaminates.

SUMMARY OF THE INVENTION

Disclosed is a method for remediating soil which is contaminated by one or more hydrophobic organic chemicals, comprising:

contacting the contaminated soil with an aqueous composition comprising a surfactant prepared by reacting a sulfonate of the formula

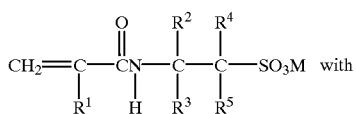

an amine of the formula

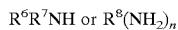

wherein $R^1$ is hydrogen or methyl, $R^2$ is hydrogen or an alkyl group containing up to 18 carbon atoms, and each of $R^3$, $R^4$ and $R^5$ is individually hydrogen or an alkyl group containing up to 7 carbon atoms and M is an alkali metal, an alkaline earth metal or $-NR^{10}R^{11}R^{12}$ wherein $R^{10}$, $R^{11}$ and $R^{12}$ are independently hydrogen or hydrocarbyl groups containing from 1 to 22 carbon atoms, wherein $R^6$ comprises a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 6 to 50 carbon atoms, or $R^9NH(CH_2)_3-$ wherein $R^9$ comprises a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 6 to 50 carbon atoms; $R^7$ is $-(CH_2)_3NH_2$; n is 1 or 2 and when n is 1, $R^8$ comprises a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 6 to 50 carbon atoms and when n is 2, $R^8$ is a hydrocarbylene group containing from 6 to 50 carbon atoms

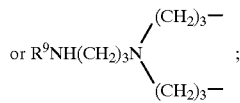

whereby at least a portion of said hydrophobic organic chemical becomes associated with said aqueous composition.

Thereafter the aqueous composition and organic chemicals associated therewith can be removed from the soil, or they can be decontaminated by a biological process.

DETAILED DESCRIPTION OF THE INVENTION

In the process of the present invention, the term "soil" is used in a generic sense to refer to the various materials which can be encountered in the earth and which can be the subject of contamination. Soil, therefore, includes rocks, sand, gravel, clays, silt, humus, loess, and other such components, alone or in combination, and including varying amounts of water which may be found in the presence of such components, as is found in the ground. The particular composition of soil varies from location to location in a way which is widely recognized and is well known to those skilled in the art. The particular type of soil for which the present invention is suitable is not particularly limited. For testing and evaluation purposes, a standard soil known as "Canadian River Alluvium," consisting of 72% sand, 27% silt and clay (on a dry basis), and an organic carbon content of 0.07%, is sometimes employed.

Soil can be contaminated by a variety of exogenous organic materials. The contaminants can be associated with the solid components of the soil or the water component of the soil (i.e., groundwater) or both. These contaminants are often characterized by a greater or lesser degree of hydrophobicity, water insolubility, and sometimes a tendency to sorb to various soil components. These properties make remediation of the soil more difficult. Common contaminants include crude oils, that is, mineral oils, petroleum, solvent or acid treated mineral oils, and oils derived from coal or shale. Synthetic oils can also be contaminants: these include hydrocarbon oils, halo-substituted hydrocarbon oils, alkylene oxide polymers, esters of dicarboxylic acids and polyols, esters of phosphorus-containing acids, polymeric tetrahydrofurans and silicon-based oils. Also included are crude oil fractions and refined hydrocarbons such as gasolines, kerosene, diesel fuel, and fuel oil. Also included are commercial oil-containing compositions, such as motor oils and other lubricants, transmission fluids, and hydraulic fluids.

The general terms used for soil contaminants are NAPL's (non-aqueous phase liquids) and DNAPL's (dense non-aqueous phase liquids). The Environmental Protection Agency (EPA), U.S. Department of Energy (DOE), U.S. Department of Interior (DOI), and U.S. Department of Defense (DOD) have further classified these materials as follows:

1. Non-halogenated volatile organic compounds
2. Halogenated volatile organic compounds
3. Non-halogenated semi-volatile organic compounds
4. Halogenated semi-volatile organic compounds
5. Fuels Sites where non-halogenated and halogenated volatile organic compounds may be found include burn pits, chemicals manufacturing plants or disposal areas, contaminated marine sediments, disposal wells and leach fields, electroplating/metal finishing shops, firefighting training areas, hangars/aircraft maintenance areas, landfills and burial pits, leak collecting and system sanitary lines, leaking storage tanks, radioactive/mixed waste disposal areas, oxidation ponds/lagoons, paint stripping and spray booth areas, pesticide/herbicide mixing areas, solvent degreasing areas, surface impoundments, and vehicle maintenance areas.

A non-exhaustive list of typical non-halogenated volatile organic compounds (excluding fuels and gas phase contaminants) encountered at many sites include the following: n-butanol, 4-methyl-2-pentanone, acetone, acrolein, acrylonitrile, aminobenzene, carbon disulfide, cyclohexane, ethanol, ethyl acetate, ethyl ether, isobutyl alcohol, methanol, methyl ethyl ketone, methyl isobutyl ketone, styrene, tetrahydrofuran and vinyl acetate.

A non-exhaustive list of typical halogenated volatile organic compounds encountered at many sites include the following: 1,1,1,2-tetrachloroethane; 1,1,1-trichloroethane; 1,1,2,2-tetrachloroethane; 1,1,2-trichloroethane; 1,1-dichloroethane; 1,1-dichloroethylene; 1,2-dichloroethane; 1,2-dichloropropane; bromoform; bromoethane; carbon tetrachloride; chlorodibromomethane; chloroethane; chloroform; chloropropane; cis-1,2-dichloroethylene; glycerol trichlorohydrin; hexachlorobutadiene; hexachlorocyclopentadiene; hexachloroethane; methylene chloride, chloroprene; pentachloroethane; perchloroethylene; propylene dichloride; 1,2-trans-dichloroethylene; 1,3-cis-dichloro-1-propene; 1,3-trans-dichloropropene; 1-chloro-2-propene; 2-butylene dichloride; bromodichloromethane; dibromochloropropene; dibromomethane; dichlorobromomethane; chloromethane, ethylene dibromide; fluorotrichloromethane; trichlorotrifluoroethane; monochlorobenzene; trichloroethylene; vinyl chloride; and vinylidene chloride.

Sites where non-halogenated and halogenated semi-volatile organic compounds may be found are the same sites as for non-halogenated and halogenated volatile organic compounds, but also includes wood preserving sites.

A non-exhaustive list of typical non-halogenated semi-volatile organic compounds encountered at many sites include the following: 1,2-benzanthracene; 1,2-diphenylhydrazine; 1-aminonaphthalene; 2,3-phenylenepyrene; 2,4-dinitrophenol; 2-aminonaphthalene; 2-methylnaphthalene; 2-nitroaniline; 2-nitrophenol; 3-nitroaniline; 4,6-dinitro-2-methylphenol; 4-nitroaniline; 4-nitrophenol; acenaphthene; acenaphthylene; alkyldioxybenzene methylene ether; anthracene; benzidine; benzo(a) anthracene; benzo(a)pyrene; benzo(b)fluoranthene; benzo(k)fluoranthene; benzoic acid; benzyl alcohol; bis(2-ethylhexyl)phthalate; butylbenzylphthalate; chrysene; dibenzofuran; diethylphthalate; dimethylphthalate; di-n-butyl phthalate; di-n-octyl phthalate; diphenylenemethane; ethion; ethyl parathion; fluorene; indeno(1,2,3-cd)pyrene; isophorone; malathion; methylparathion; naphthalene; n-nitrosodimethylamine; n-nitrosodi-n-propylamine, parathion; phenanthrene; phenyl naphthalene; pyrene and tetraphene.

A non-exhaustive list of typical halogentated semi-volatile organic compounds encountered at many sites include the following: 1,2,4-trichlorobenzene; 1,2-bis(2-chloroethoxy)ethane; 1,2-dichlorobenzene; 1,3-dichlorobenzene; 1,4-dichlorobenzene; 2,4,5-trichlorophenol; 2,4,6-trichlorophenol; 2,4-dichlorophenol; 4-chloroaniline; 2-chloronaphthalene; 2-chlorophenol; 3,3-dichlorobenzidine; 4-bromophenyl ether; 4-chlorophenyl phenylether; bis(2-chloroethoxy) methane; bis(2-chloroethoxy) phthalate; bis(2-chloroethyl) ether; bis(2-chloroisopropyl) ether; chlorodane; chlorobenzilate; chlorophenothane; hexachlorobenzene; hexachloro-butadiene; p-chloro-m-cresol; pentachloro-benzene; pentachlorophenol (PCP); polychlorinated biphenyls (PCBs); quintozene; tetrachlorophenol and unsym-trichlorobenzene.

Sites where fuel may be found include the same sites as already mentioned for both non-halogenated and halogentated volatile and semi-volatile compounds. A non-exhaustive list of typical fuel contaminants encountered are as follows: the isomeric tetramethylbenzenes; the isomeric trimethylbenzenes; the isomeric methyl substituted and ethyl substituted alkanes wherein the alkanes comprise butane, pentane, hexane, heptane, octane, nonane and decane; 4-methylphenol; anthracene; benz(a)anthracene; benzene; benzo(a)pyrene; the isomeric cresols; fluoranthene; fluorene; the isomeric xylenes; naphthalene; phenanthrene; phenol; pyrene; pyridine; toluene and vinylbenzene.

The foregoing contaminants may be associated with the solid soil particles, with the water component of the soil, or in any combination thereof.

The method of this invention utilizes an aqueous composition comprising a surfactant prepared by reacting a salt of an acrylamidoalkanesulfonic acid, also known as a sulfonate, with an amine. The salt of this sulfonic acid can be represented by the formula

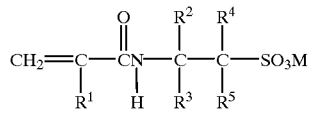

wherein $R^1$ is hydrogen or methyl, $R^2$ is hydrogen or an alkyl group containing up to 18 carbon atoms, and each of $R^3$, $R^4$ and $R^5$ is individually hydrogen or an alkyl group containing up to 7 carbon atoms. Examples of lower alkyl radicals are methyl, ethyl, n-propyl, isopropyl, 1-butyl, 2-butyl, 2-pentyl, 3-hexyl and 3-methylpentyl. The M comprises an alkali metal, an alkaline earth metal or an amino compound.

The reaction to form the salt is a simple neutralization of an acrylamidoalkanesulfonic acid, usually with a metal base or amine comprising at least one metal oxide, metal hydroxide, metal salt of a weak acid such as carbonic, boric or acetic acid or amine. The salt is most often a metal carbonate or bicarbonate, e.g., sodium carbonate or sodium bicarbonate. Also useful, in place of such salts, are cation exchange resins in the metal salt form (usually alkali metal and especially sodium), typically strong acid or weak acid resins in which the acid group may be, for example, sulfonic or carboxylic acid groups.

The preferred acrylamidoalkanesulfonic acids are those in which $R^4$ and $R^5$ are each hydrogen, $R^2$ is an alkyl group containing up to 7 carbon atoms and $R^3$ is hydrogen or an alkyl group containing up to 7 carbon atoms, usually the latter. Illustrative acids are 2-acrylamidoethanesulfonic acid, 2-acrylamidopropanesulfonic acid, 2-acrylamido-2-methylpropanesulfonic acid, 2-methacrylamidopropanesulfonic acid, 2-methacrylamido-2-methylpropanesulfonic acid and 2-methacrylamido-2-methylbutanesulfonic acid. A particular preference is expressed for 2-acrylamido-2-methylpropanesulfonic acid, commercially available from The Lubrizol Corporation as AMPS® monomer, and from Toa Gosei under the trade name "ATBS.", and to a somewhat lesser extent for its methacrylamido homolog.

The salts of this sulfonic acid preferably are metals and include, in particular, the alkali metal and alkaline earth metal salts, chiefly those of lithium, sodium, potassium, magnesium, calcium and barium, and especially those of sodium, potassium, magnesium and calcium. A most preferred metal is sodium. Such materials and their methods of preparation are disclosed, for instance, in U.S. Pat. No. 3,544,597.

The different types of amines are envisioned as reacting with the above-described sulfonate. These amines are of the formula

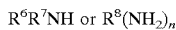

wherein $R^6$ comprises a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 6 to 50 carbon atoms, or $R^9NH(CH_2)_3$— wherein $R^9$ comprises a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 6 to 50 carbon atoms; $R^7$ is —$(CH_2)_3NH_2$; n is 1 or 2 and when n is 1, $R^8$ comprises a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 6 to 50 carbon atoms and when n is 2, $R^8$ is a hydrocarbylene group containing from 6 to 50 carbon atoms

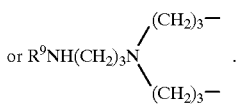

As used herein, the term "hydrocarbyl", "hydrocarbyl substituent" or "hydrocarbyl group" is used in its ordinary sense, which is well known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule;

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The term "hydrocarbyl" is also intended to include hydrocarbylene, that is, groups having bonds to non-hydrocarbon functionality at two places, i.e., two open valences.

When the amine is $R^6R^7NH$ wherein $R^6$ is an aliphatic group wherein the aliphatic group contains from 6 to 50 carbon atoms and $R^7$ is —$(CH_2)_3NH_2$, the amine that is generated has the structure $C_{6-50}$ aliphatic $NH(CH_2)_3NH_2$. This structure is N-aliphatic trimethylenediamine. Preferably, $R^6$ contains up to 22 carbon atoms and most preferably $R^6$ contains from 10 to 18 carbon atoms. These are the preferred amines of this invention and these amines are available from AKZO as Duomeen O™ amine, an N-oleyl-1,3-diaminopropane, Duomeen T™ amine, an N-tallow-1,3-diaminopropane, Duomeen C™ amine, an N-coco-1,3-diaminopropane and Duomeen S™ amine, an N-soya-1,3-diaminopropane.

When $R^6$ is $R^9NH(CH_2)_3$— wherein $R^9$ is an aliphatic group containing from 6 to 50 carbon atoms and $R^7$ is —$(CH_2)_3NH_2$, the amine that is generated has the structure $C_{6-50}$ aliphatic $NH(CH_2)_3NH(CH_2)_3NH_2$. This structure is N-aliphatic dipropylenetriamine. Preferably $R^9$ contains up to 22 carbon atoms and most preferably contains from 10 to 18 carbon atoms. This amine is available from AKZO as Trimeen T™ amine.

When the amine is $R^8(NH_2)_n$ wherein $R^8$ is an aliphatic group containing from 6 to 50 carbon atoms and n is 1, the amine structure is $C_{6-50}$ aliphatic $NH_2$ which defines fatty amines. Preferably $R^8$ is an alkyl group and contains up to 22 carbon atoms and most preferably contains from 8 to 18 carbon atoms. A non-exhaustive, but exemplary list of fatty amines are hexylamine, heptylamine, octylamine, 2-ethylhexylamine, nonylamine, decylamine, undecylamine, dodecylamine, tridecylamine, tetradecylamine, pentadecylamine, hexadecylamine, heptadecylamine, octadecylamine, oleylamine, etc.

When n is 2, $R^8$ is a hydrocarbylene group, specifically an alkylene group containing from 6 to 50 carbon atoms, preferably up to 22 carbon atoms and most preferably up to 18 carbon atoms. The di-primary amine may be a straight chain di-primary amine and the amino groups may both be terminal, one terminal and one internal or both internal such as 1,6-diaminohexane; 1,5-diaminohexane and 2,5-diaminohexane, respectively. $R^8$ may be branched as in 2-methyl-1,5-pentanediamine. Additionally, when n is 2, $R^8$ is

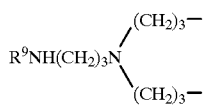

wherein $R^9$ is as defined above. The amine that is generated is a tetraamine of the

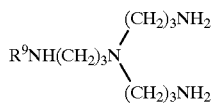

formula

In preparing the surfactant, the amine and salt of the acrylamidoalkanesulfonic acid are reacted together. The reaction is an addition reaction. The amine adds across the carbon-carbon double bond. The amine contains amine reactive hydrogens and each amine reactive hydrogen is capable of reacting with one mole of the salt of the acrylamidoalkanesulfonic acid. One mole of a primary amine which contains 2 amine reactive hydrogens will react with up to 2 moles of the salt of the acrylamidoalkanesulfonic acid. In the case of the Duomeen™ amines, one mole which contains 3 amine reactive hydrogens will react with up to 3 moles of the salt of the acrylamidoalkanesulfonic acid. The di- primary amines and the Trimeen™ amine each contain 4 amine reactive hydrogens and 1 mole of these amines will react with up to 4 moles of the metal salt. This defines the upper limit of the number of moles of the salt that can be reacted with one mole of any of the amines of this invention.

When 1 mole of any of these amines is used, at least one mole of salt is employed, regardless of the number of amine reactive hydrogens that are present.

As examples of the various products that can be obtained, the following shows the reaction of one mole of a Duomeen™ amine with from 1 to 3 moles of a sodium salt of 2-acrylamido-2-methylpropanesulfonic acid.

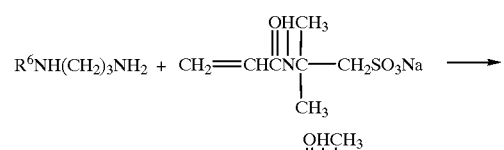

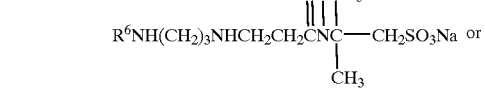

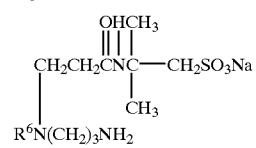

3 amine reactive hydrogens: 1 mole Na salt

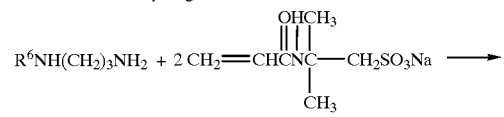

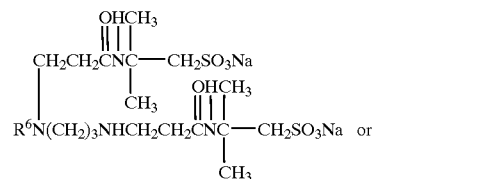

3 amine reactive hydrogens: 2 moles Na salt

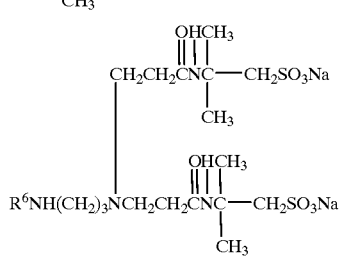

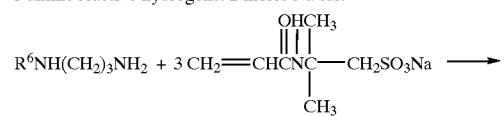

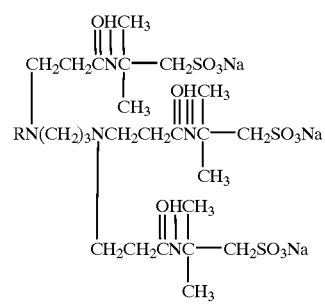

3 amine reactive hydrogens: 3 moles Na salt

The following shows the reaction of one mole of a mono primary amine with from 1 to 2 moles of a sodium salt of 2-acrylamido-2-methylpropanesulfonic acid.

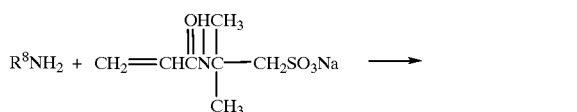

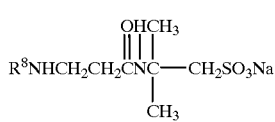

2 amine reactive hydrogens: 1 mole Na salt

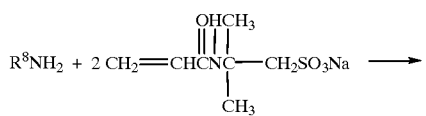

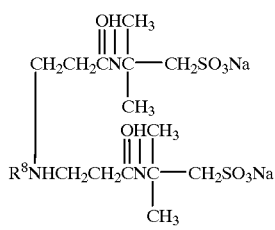

2 amine reactive hydrogens: 2 moles Na salt

Suitable conditions leading to the controlled degree of reaction characteristic of the present invention include combining the amine with an appropriate amount of the salt of acrylamidoalkanesulfonic acid in a suitable solvent (such as water and/or alcohols) at a temperature of 40 to 130° C., preferably 70 to 100° C. for 4 to 30 hours. The total concentration of the reactants can be 1 to 50% by weight, preferably 5 to 30% by weight. Optionally, a free radical inhibitor such as monomethyloxyhydroquinone can be used at a suitable concentration such as about 1000 parts per million.

The above-described surfactant is used in water or other solvents, generally at a concentration of 0.005 to 5 weight percent, preferably 0.25 to 3 percent and more preferably 2 to 3 percent (based on active chemical, exclusive of diluent water or solvents). The amounts can be adjusted, as needed, to optimize performance for a particular combination of soil and contaminant. For in situ remediation, concentrations of 1 to 3 weight percent are sometimes preferred; for ex situ remediation (where soil is removed from the ground and treated), concentrations of 0.01 to 0.5 weight percent are sometimes preferred. The surfactant can be dissolved or otherwise dispersed in the water; preferably the surfactant is dissolved.

If desired, one or more additional surfactants, preferably in amounts within the ranges set forth above, can be used along with the above-described materials. Common surfactants can be characterized as non-ionic, anionic, cationic, or amphoteric. Non-ionic surfactants include nonylphenol (POE5), octylphenol (POE5), lauryl alcohol (POE5), octadecyl alcohol (POE5), sorbitan monooleate, sorbitan monooleate (POE5), glycerol monooleate, lauryl alcohol polyglycoside, oleicdiethanolamide, oleylhydroxymethyl imidazoline, oleylamine (POE5), oleyl dimethylamine oxide, poly(ethylene oxide [m.w. 400]) dioleate, and poly (ethylene oxide) 14 oleate.

Anionic surfactants include sodium laurate, sodium xylene sulfonate, sodium dodecylbenzene sulfonate, sodium monomethylnaphthalene sulfonate, sodium dimethylnaphthalene sulfonate, dioctyl sodium sulfosuccinate, sodium hexadecyl sulfonate, dodecyldiphenyloxide disulfonate (disodium salt), hexadecyldiphenyloxide disulfonate (disodium salt), sodium decyl sulfate, sodium lauryl (POE2) sulfate, nonylphenol (POE2) sulfate (sodium salt), sodium N-methyl-N-oleoyl taurate, sodium di-2-ethylhexyl phosphate, sodium cocyl isethionate, and sodium lauryl (POE13) acetate.

Cationic surfactants include benzyl trimethylammonium bromide and cetyl pyridinium chloride. Amphoteric surfactants include lecithin and lauryldimethylhydroxypropylsulfobetaine.

In the foregoing materials, the expression "POEn" indicates an ethylene oxide oligomer containing n repeat units, attached by an ether linkage through an alcoholic or phenolic oxygen atom of the remainder of the molecule.

The surfactant-water combination is used to contact the contaminated soil and to remove organic contaminants therefrom by mechanical techniques which are known to those skilled in the art. Using a process based on the conventional "pump and treat" procedure, the aqueous composition can be injected into the ground at or near a site of contamination, and a water composition, comprising the surfactant and a portion of the contaminants, can be pumped out from the ground in such a way that the water/surfactant composition has traversed at least a portion of the contaminated soil. The aqueous composition thereby recovered can be treated for waste processing and management. Such treatment can consist of separation of the contaminant from the water and surfactant by known means such as air stripping, foam fractionation, distillation, coagulation, solidification, filtration, or other such techniques, and subsequent disposal of the contaminant, for example, by combustion. It is also possible to recover some or all of the surfactant for reuse, if desired.

Alternatively, a portion of contaminated soil can be removed from the ground and treated with a suitable aqueous solution of surfactant in an appropriate apparatus. The soil can be contacted with the surfactant solution by stirring or slurrying in a batch-type operation, or by passing the solution through the soil in a continuous fashion. The aqueous solution, containing a portion of the organic contaminant, can be separated from the soil by known methods such as filtration, decantation, or centrifugation. Remediation by removal of the soil and treatment in this manner is particularly suitable for small and localized areas of contamination or for spot testing and evaluation purposes.

In yet another approach, the surfactants of the present invention can be used in surfactant-assisted bioremediation processes, that is, a process in which the decontamination is effected by a surfactant-assisted biological process. In such processes, it is speculated that the surfactant may serve to "loosen" the contaminant from the soil particles and make it more readily available for decontamination. The contamination itself is effected, optionally in situ, by biological processes resulting from, for instance, the action of bacteria or other organisms, whether organisms naturally occurring (naturally present in the soil) or selected or designed for the purpose of decontamination. In this embodiment, physical removal of the aqueous compositions and organic chemicals associated therewith from the soil may not be necessary.

It is known that some of the materials described above may interact in the final formulation, so that the components of the final formulation may be different from those that are initially added. For instance, metal ions (of e.g., a detergent) can migrate to other acidic sites of other molecules. The products formed thereby, including the products formed upon employing the surfactant of this invention in its intended use, may not be susceptible of easy description. Nevertheless, all such modifications and reaction products are included within the scope of the present invention.

The following examples are illustrative of the preparation of the surfactants of this invention. Unless otherwise indicated, all parts and percentages are by weight.

EXAMPLE 1
(3 amine Reactive hydrogens/2 moles Na salt)

Added to a 2 liter 4 neck flask equipped with a stirrer and thermowell is 500 parts methanol, 568.4 parts (1.44 moles) of a 42% aqueous solution of the sodium salt of 2-acrylamido-2-methylpropanesulfonic acid and 186 parts (0.72 moles) of Duomeen C™ amine. The mixture is stirred and heated to reflux at about 75° C. Reflux conditions are maintained for 30 hours. At the conclusion of the heating time, methanol and water are removed from the reaction mixture using a vacuum oven while maintaining the temperature below 100° C. The product is 431 parts of a yellowish solid.

EXAMPLE 2
(3 amine Reactive hydrogens/2 moles Na salt)

To a 500 ml flask are added 39.5 (0.1 moles) parts of a 42% aqueous solution of the sodium salt of 2-acrylamido-2-methylpropanesulfonic acid, 17.7 parts (0.05 moles) of Duomeen T™ amine, 350 parts water and 0.1 part hydroquinone monomethoxy ether as an inhibitor. The mixture is stirred at 95° C. for 16 hours. At the end of this time, a homogeneous solution results. The water is removed from the mixture as in Example 1, leaving a dull orange solid product that is water soluble.

EXAMPLE 3
(3 amine Reactive hydrogens/2 moles Na salt)

To a flask is charged 39.5 parts (0.1 moles) of a 42% aqueous solution of the sodium salt of 2-acrylamido-2-methylpropanesulfonic acid, 300 parts water, 0.1 part hydroquinone monomethoxy ether inhibitor and 12.9 parts (0.05 moles) of Duomeen C™ amine. The mixture is warmed to 95° C. with stirring and maintained at that temperature for 16 hours. Water is removed from the resulting solution as in Example 1, providing a dull yellow powder that is water soluble.

EXAMPLE 4
(3 amine Reactive hydrogens/2 moles Na salt)

To a flask is charged 39.5 parts (0.1 moles) of a 42% aqueous solution of the sodium salt of 2-acrylamido-2-methylpropanesulfonic acid, 69.3 parts water, 0.1 part of hydroquinone monomethoxy ether inhibitor and 12.9 parts (0.05 moles) of Duomeen C™ amine. The mixture is warmed to 95° C. with stirring and maintained at that temperature for 30 hours. The resulting solution is a clear yellow liquid, containing 70% water which does not require filtration. Evaluation by $^1$H-NMR indicates about 1% unreacted olefin.

EXAMPLE 5
(3 amine Reactive hydrogens/2 moles Na salt)

To a 500 ml flask are added 39.5 parts (0.1 moles) of a 42% aqueous solution of the sodium salt of 2-acrylamido-2-methylpropanesulfonic acid, 17.5 parts (0.05 moles) of Duomeen O™ amine, 350 parts water and 0.01 parts hydroquinone monomethoxy ether inhibitor. The mixture is stirred at 95° C. for 16 hours whereupon the mixture is a homogeneous solution. Water is removed from the resulting solution as in Example 1 to provide a water soluble powder.

EXAMPLE 6
(2 amine Reactive hydrogens/1 mole Na salt)

To a flask is charged 395 parts (1 mole) of a 42% aqueous solution of the sodium salt of 2-acrylamido-2-methylpropanesulfonic acid, 2500 parts water, 1.0 part hydroquinone monomethoxy ether inhibitor and 269 parts (1 mole) oleylamine. The contents are mixed and heated to 95° C. and held there for 30 hours. Water is removed as per Example 1 to provide the surfactant.

EXAMPLE 7
(2 amine Reactive hydrogens/2 moles Na salt)

The procedure of Example 6 is repeated, except that 134.5 parts (0.5 moles) of oleylamine is employed.

EXAMPLE 8
(4 amine reactive hydrogens/4 moles Na salt)

To a flask is charged 395 parts (1 mole) of a 42% aqueous solution of the sodium salt of 2-acrylamido-2-methylpropanesulfonic acid, 2500 parts water, 1.0 part hydroquinone monomethoxy ether inhibitor and 43 parts (0.25 moles) of 1,10-diaminodecane. The contents are mixed and heated to 95° C. and held there for 25 hours. Water is removed as per Example 1 to provide the surfactant.

EXAMPLE 9
(3 amine Reactive hydrogens/1 mole Na salt)

The procedure of Example 6 is repeated, except that the oleylamine is replaced with 258 parts (1 mole) of Duomeen C™ amine.

EXAMPLE 10
(3 amine Reactive hydrogens/3 moles Na salt)

The procedure of Example 6 is repeated, except that the oleylamine is replaced with 86 parts (0.33 moles) of Duomeen C™ amine.

The surfactants of this invention are evaluated in the laboratory in an emulsion formation test. In this test, 2 ml of a surfactant solution is mixed with 2 ml of a contaminant. The contaminant is 1,1,1-trichloroethane. The surfactant solution is prepared by combining together a specific number of microliters of a 16% weight aqueous solution of the product of the above Example 1, a 50% weight aqueous solution of isopropyl alcohol, a 2% weight aqueous solution of calcium chloride, and a 2% weight aqueous solution of sodium chloride. Additional water in microliters is added to give a 2 ml. surfactant solution.

But for the microliter quantities, the above surfactant solution is identical to that which would be used at a contamination site.

The above surfactant solution and contaminant are mixed together and permitted to separate. The separation falls in one of three Winsor classes, designated Winsor I, Winsor II, or Winsor III. Winsor I means the sample mixture separated into two phases with the phases identified as an emulsion phase/aqueous phase or as an emulsion phase/organic phase. In the field, the emulsion phase contains the entrapped contaminant. It is the entrapped contaminant that is removed in situ or separated out ex situ. The aqueous phase, when present in Winsor I is also pumped out. This aqueous phase which is primarily the surfactant solution can be pumped back in to emulsify with the remaining contaminant. This repumping or reusing of the surfactant is similar to an extraction in a separatory funnel.

Like Winsor I, Winsor II also means a separation into two phases. However, there is no organic phase. There is only an emulsion phase and an aqueous phase. In the emulsion phase of a Winsor I, the organic contaminant is pulled into the aqueous phase. But in a Winsor II, the aqueous phase is pulled into the organic contaminant phase which is an invert emulsion. Invert emulsions are to be avoided in soil remediation. A surfactant that gives a Winsor II causes the ground water to be pulled into the contaminant thus making the contamination situation much worse.

In the Winsor III, there are three phases, an organic phase, an emulsion phase (actually a microemulsion) and an aqueous phase. In a Winsor III, it is desirable to have a high microemulsion phase and low, but equal, organic and aqueous phases. This signifies that a high percentage of contaminant can be removed in just one pass of surfactant solution into the soil. However, even with a low percentage of microemulsion phase, a surfactant solution may still have utility simply by being reused and subsequently repumped back into the soil.

The following Table I gives results of a surfactant solution prepared from the procedure of Example 1 with isopropyl alcohol, calcium chloride, sodium chloride and water being mixed with a contaminant of 1,1,1-trichloroethane. For the results in all the tables, the sum of the organic, emulsion and aqueous is 4 ml. However, in some instances, a sample will have a Winsor I even thought the emulsion is reported out as a zero. This only means that the emulsion phase was too small to measure. In other instances, a Winsor value cannot be assigned because no emulsion phase is formed. This means that the surfactant solution and contaminant form two distinct phases and are designated as TP in the tables.

TABLE I

| | Microliters | | | | | Result (ml) | | | |
|---|---|---|---|---|---|---|---|---|---|
| Test No. | Surfactant solution | Isopropyl alcohol solution | CaCl$_2$ solution | NaCl solution | Additional Water | Organic | Emulsion | Aqueous | Winsor |
| 1 | 750 | 120 | 150 | 100 | 880 | 0.1 | 2.2 | 1.7 | III |
| 2 | 500 | 240 | 0 | 350 | 910 | 0.3 | 1.7 | 2.0 | III |
| 3 | 500 | 120 | 0 | 600 | 780 | 0.2 | 1.8 | 2.0 | III |
| 4 | 250 | 120 | 0 | 350 | 1280 | 0.7 | 1.3 | 2.0 | III |
| 5 | 750 | 120 | 0 | 350 | 780 | 0.2 | 1.8 | 2.0 | III |
| 6 | 500 | 0 | 150 | 100 | 1250 | 0.3 | 1.7 | 2.0 | III |
| 7 | 500 | 240 | 150 | 100 | 1010 | 0.5 | 1.7 | 1.8 | III |
| 8 | 500 | 240 | 150 | 600 | 510 | 0.2 | 2.2 | 1.6 | III |

Table II gives results of surfactant solution prepared by utilizing a surfactant as prepared in Example 2 with isopropyl alcohol, calcium chloride, sodium chloride and water that is mixed with a contaminant of 1,1,1-trichloroethane Industries, Inc., West Patterson, N.J. As in Tables I and II, the surfactant solutions of Tables III and IV are prepared by combining together a specific number of microliters of a 16% weight aqueous solution of the commercial surfactant,

TABLE II

| | | Microliters | | | | | Result (ml) | | |
|---|---|---|---|---|---|---|---|---|---|
| Test No. | Surfactant solution | Isopropyl alcohol solution | CaCl$_2$ solution | NaCl solution | Additional Water | Organic | Emulsion | Aqueous | Winsor |
| 1 | 250 | 120 | 150 | 100 | 1380 | 0.2 | 2.0 | 1.8 | III |
| 2 | 750 | 120 | 150 | 100 | 880 | 0.2 | 1.7 | 2.1 | III |
| 3 | 500 | 240 | 300 | 350 | 610 | 1.3 | 2.1 | 0.6 | III |
| 4 | 250 | 0 | 150 | 350 | 1250 | 0.2 | 2.1 | 1.7 | III |
| 5 | 750 | 0 | 150 | 350 | 750 | 0.2 | 2.0 | 1.8 | III |
| 6 | 250 | 240 | 150 | 350 | 1010 | 0.1 | 2.0 | 1.9 | III |
| 7 | 500 | 120 | 0 | 100 | 1280 | 0.2 | 2.0 | 1.8 | III |
| 8 | 500 | 120 | 0 | 600 | 780 | 0.1 | 2.0 | 1.9 | III |
| 9 | 500 | 120 | 300 | 100 | 980 | 0.4 | 1.8 | 1.6 | III |
| 10 | 250 | 120 | 300 | 350 | 980 | 0.3 | 1.7 | 2.0 | III |
| 11 | 750 | 120 | 300 | 350 | 480 | 0.1 | 2.2 | 1.7 | III |
| 12 | 500 | 0 | 150 | 100 | 1250 | 0.4 | 1.8 | 1.8 | III |
| 13 | 500 | 120 | 150 | 350 | 880 | 0.1 | 2.0 | 1.9 | III |
| 14 | 500 | 120 | 150 | 350 | 880 | 0.1 | 2.0 | 1.9 | III |
| 15 | 500 | 120 | 150 | 350 | 880 | 0.1 | 2.0 | 1.9 | III |

Tables III and IV give results of surfactant solutions prepared by utilizing commercial surfactants that have been disclosed in several publications and that are widely used in surfactant enhanced soil remediation. In Table III the commercial surfactant is Dowfax™ 8390 available from Dow Chemical, Midland, Mich. In Table IV the commercial surfactant is Aerosol™ M-80 available from Cytec a 50% weight aqueous solution of isopropyl alcohol, a 2% weight aqueous solution of calcium chloride, and a 2% weight aqueous solution of sodium chloride. Additional water in microliters is added to give a 2 ml surfactant solution. These surfactant solutions utilizing these commercial surfactants are then combined with 2 ml of contaminant of 1,1,1-trichloroethane.

TABLE III

| | | Microliters | | | | | Result (ml) | | |
|---|---|---|---|---|---|---|---|---|---|
| Test No. | Surfactant solution | Isopropyl alcohol solution | CaCl$_2$ solution | NaCl solution | Additional Water | Organic | Emulsion | Aqueous | Winsor |
| 1 | 1500 | 0 | 0 | 0 | 500 | 1.9 | 0.1 | 2.0 | III |
| 2 | 750 | 0 | 0 | 0 | 1250 | 1.9 | 0.1 | 2.0 | III |
| 3 | 750 | 0 | 0 | 350 | 900 | 2.0 | 0 | 2.0 | TP |
| 4 | 750 | 120 | 0 | 600 | 530 | 2.0 | 0 | 2.0 | TP |
| 5 | 750 | 240 | 0 | 350 | 660 | 2.0 | 0 | 2.0 | TP |
| 6 | 750 | 240 | 300 | 350 | 360 | 2.0 | 0 | 2.0 | TP |
| 7 | 750 | 120 | 300 | 350 | 480 | 2.0 | 0 | 2.0 | TP |
| 8 | 750 | 120[1] | 0 | 350 | 780 | 2.0 | 0 | 2.0 | TP |

[1]sec-butyl alcohol is substututed for isopropyl alcohol.
TP = two distinct phases

TABLE IV

| | | Microliters | | | | | Result (ml) | | |
|---|---|---|---|---|---|---|---|---|---|
| Test No. | Surfactant solution | Isopropyl alcohol solution | CaCl$_2$ solution | NaCl solution | Additional Water | Organic | Emulsion | Aqueous | Winsor |
| 1 | 1500 | 0 | 0 | 0 | 500 | 2.0 | 0 | 2.0 | TP |
| 2 | 750 | 0 | 0 | 0 | 1250 | 1.9 | 0 | 2.1 | I |
| 3 | 750 | 0 | 0 | 350 | 900 | 0 | 2.10 | 1.9 | II |
| 4 | 750 | 120 | 0 | 600 | 530 | 2.0 | 0 | 2.0 | TP |

TABLE IV-continued

| | | | Microliters | | | Result (ml) | | | |
|---|---|---|---|---|---|---|---|---|---|
| Test No. | Surfactant solution | Isopropyl alcohol solution | CaCl$_2$ solution | NaCl solution | Additional Water | Organic | Emulsion | Aqueous | Winsor |
| 5 | 750 | 240 | 0 | 350 | 660 | 2.1 | 0 | 1.9 | I |
| 6 | 750 | 240 | 300 | 350 | 360 | 2.1 | 0 | 1.9 | I |
| 7 | 750 | 120 | 300 | 350 | 480 | 2.1 | 0 | 1.9 | I |
| 8 | 750 | 120$^1$ | 0 | 350 | 780 | 2.2 | 0 | 1.8 | I |

$^1$sec-butyl alcohol is substututed for isopropyl alcohol.
TP = two distinct phases From the above four tables it can be observed that the surfactants of the instant invention, when made into surfactant solutions as shown in Tables I and II, are much more effective in emulsifying a contaminant than are commercial surfactants as shown in Tables III and IV when made into surfactant solutions.

While the invention has been explained in relation to its preferred embodiments, it is to be understood that various modifications thereof will become apparent to those skilled in the art upon reading the disclosure. Therefore, it is to be understood that the invention disclosed herein is intended to cover such modifications as fall within the scope of the appended claims.

What is claimed is:

1. A method for remediating soil which is contaminated by one or more hydrophobic organic chemicals, comprising:
   contacting the contaminated soil with an aqueous composition comprising a surfactant prepared by reacting a sulfonate of the formula

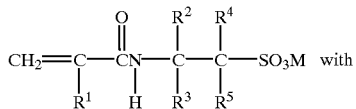

with an amine of the formula

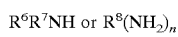

wherein R$^1$ is hydrogen or methyl, R$^2$ is hydrogen or an alkyl group containing up to 18 carbon atoms, and each of R$^3$, R$^4$ and R$^5$ is individually hydrogen or an alkyl group containing up to 7 carbon atoms and M is an alkali metal, an alkaline earth metal or —NR$^{10}$R$^{11}$R$^{12}$ wherein R$^{10}$, R$^{11}$ and R$^{12}$ are independently hydrogen or hydrocarbyl groups containing from 1 to 22 carbon atoms,
wherein R$^6$ comprises a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 6 to 50 carbon atoms, or R$^9$NH(CH$_2$)$_3$— wherein R$^9$ comprises a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 6 to 50 carbon atoms; R$^7$ is —(CH$_2$)$_3$NH$_2$; n is 1 or 2 and when n is 1, R$^8$ comprises a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 6 to 50 carbon atoms and when n is 2, R$^8$ is a hydrocarbylene group containing from 6 to 50 carbon atoms

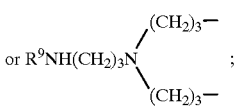

whereby at least a portion of said hydrophobic organic chemical becomes associated with said aqueous composition.

2. The method of claim 1 wherein the hydrophobic organic chemical comprises crude oil or a crude oil fraction.

3. The method of claim 1 wherein the hydrophobic organic chemical comprises a refined hydrocarbon.

4. The method of claim 1 wherein the hydrophobic organic chemical comprises a chlorinated hydrocarbon.

5. The method of claim 1 wherein R$^4$ and R$^5$ are each hydrogen.

6. The method of claim 5 wherein R$^1$ is hydrogen or methyl.

7. The method of claim 5 wherein R$^2$ is methyl.

8. The method of claim 5 wherein R$^3$ is methyl.

9. The method of claim 1 wherein M is sodium.

10. The method of claim 1 wherein the amine is R$^6$R$^7$NH wherein R$^6$ is a hydrocarbyl group comprising an aliphatic group containing up to 22 carbon atoms.

11. The method of claim 10 wherein R$^6$ contains from 10 to 18 carbon atoms.

12. The method of claim 1 wherein the amine is R$^6$R$^7$NH wherein R$^6$ is R$^9$NH(CH$_2$)$_3$— wherein R$^9$ is a hydrocarbyl group comprising an aliphatic group containing up to 22 carbon atoms.

13. The method of claim 12 wherein R$^9$ contains from 10 to 18 carbon atoms.

14. The method of claim 1 wherein n is 1 and R$^8$ is a hydrocarbyl group comprising an alkyl group containing up to 22 carbon atoms.

15. The method of claim 14 wherein R$^8$ contains from 8 to 18 carbon atoms.

16. The method of claim 1 wherein n is 2 and R$^8$ comprises an alkylene group containing up to 22 carbon atoms.

17. The method of claim 16 wherein R$^8$ contains up to 18 carbon atoms.

18. The method of claim 1 further comprising removing said aqueous compositions and organic chemicals associated therewith from the soil.

19. The method of claim 18 wherein the aqueous composition is injected into an area of contaminated soil and removed at a different location, whereby the aqueous composition passes through the contaminated soil and at least a portion of said hydrophobic organic chemical becomes associated with said aqueous composition and are hereby removed from the soil.

20. The method of claim 1 wherein contaminated soil is removed from the ground and treated with an aqueous solution of the surfactant.

21. The method of claim 1 further comprising subjecting the soil thus treated to the action of a biological process, whereby decontamination is effected.

22. The method of claim 21 wherein decontamination is effected in situ.

23. The method of claim 21 wherein the biological process is effected by naturally present bacteria.

24. The method of claim 21 wherein the biological process is effected by bacteria selected for the purposes of decontamination.

25. A method for remediating soil which is contaminated by one or more hydrophobic organic chemicals, comprising:

contacting the contaminated soil with an aqueous composition comprised of a surfactant prepared by reacting from 1 to 3 moles of a sodium salt of 2-acrylamido-2-methylpropanesulfonic acid with 1 mole of an amine of the formula $R^6R^7NH$ wherein $R^6$ is an aliphatic group containing from 6 to 22 carbon atoms and $R^7$ is —$(CH_2)_3NH_2$ and removing said aqueous compositions and organic chemicals associated therewith from the soil.

26. The method of claim 25 wherein $R^6$ contains from 10 to 18 carbon atoms.

27. A method for remediating soil which is contaminated by one or more hydrophobic organic chemicals, comprising:

contacting the contaminated soil with an aqueous composition comprised of a surfactant prepared by reacting from 1 to 2 moles of a sodium salt of 2-acrylamido-2-methylpropanesulfonic acid with 1 mole of an amine of the formula $R^6R^7NH$ wherein $R^6$ is an aliphatic group containing from 6 to 22 carbon atoms and $R^7$ is —$(CH_2)_3NH_2$ and removing said aqueous compositions and organic chemicals associated therewith from the soil.

\* \* \* \* \*